Patented Mar. 25, 1941

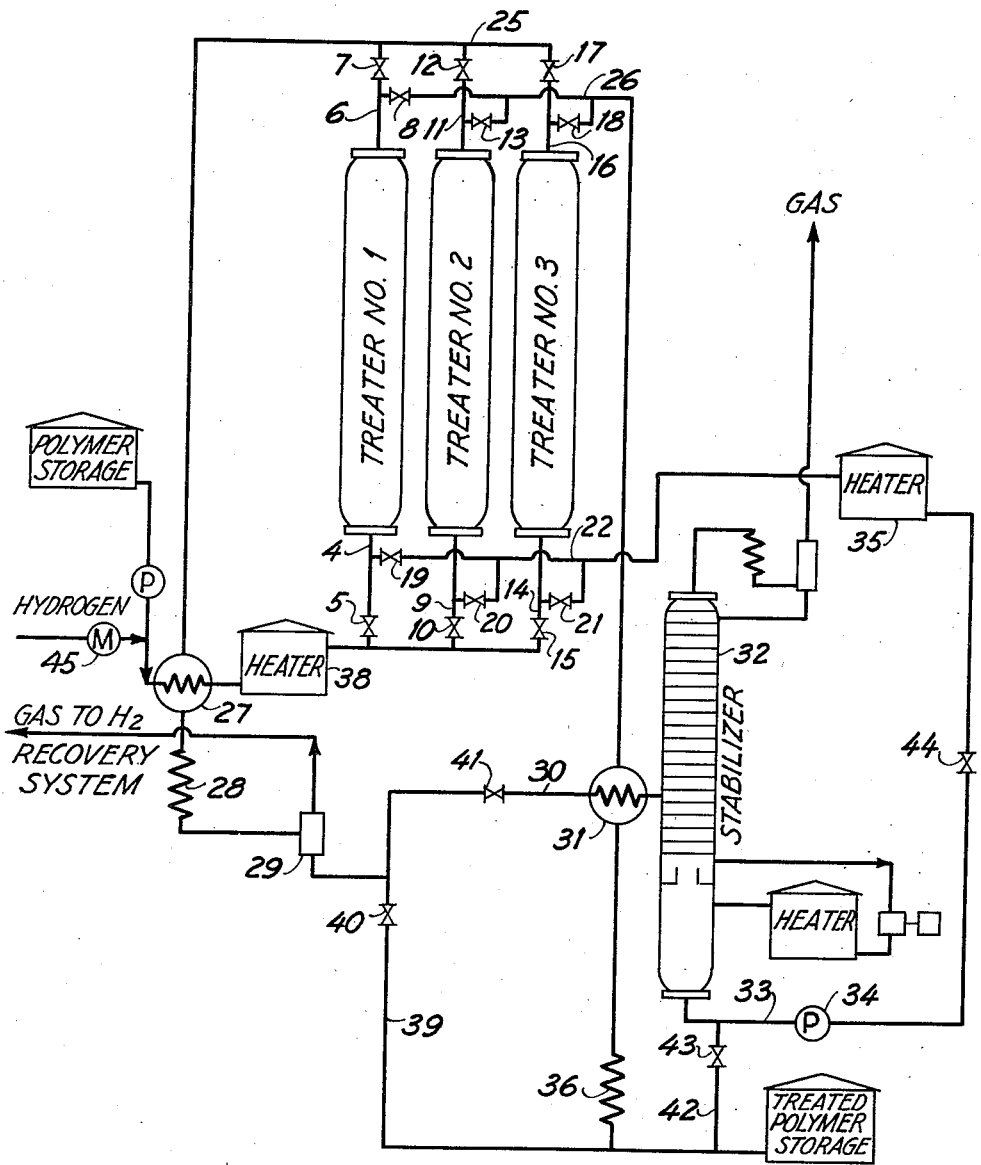

2,236,216

UNITED STATES PATENT OFFICE

2,236,216

CATALYTIC DESULPHURIZATION OF OLEFIN HYDROCARBONS

Arthur L. Lyman and Robert C. Mithoff, Berkeley, Calif., and Howard B. Nichols, Larchmont, N. Y., assignors to Standard Oil Company of California, San Francisco, Calif., a corporation of Delaware Application December 6, 1938, Serial No. 244,186

16 Claims. (Cl. 260—677)

This invention relates to a process of removing sulphur compounds from hydrocarbons composed substantially of mono-olefins. More particularly, the invention relates to the vapor phase treatment of olefin hydrocarbons of synthetic origin and generally of the motor fuel or higher boiling ranges, to decompose a major proportion of the mercaptans and/or disulphides contained therein.

It has recently become possible to prepare superior hydrocarbon mixtures, primarily for utilization as high compression ratio aircraft motor fuels and the like purposes, by polymerizing the normally gaseous and/or volatile liquid olefins contained in the products resulting upon the thermal or catalytic cracking of petroleum oils. Such olefins are ethylene, propylene, the normal- and iso-butenes and the pentenes, and the processes by which such olefins or mixtures of them are polymerized are generally catalytic in nature, employing phosphoric acid or phosphates as catalysts, as typefied by the process described in Ipatieff Patent No. 1,960,631, or employing sulphuric acid as catalyst, as typified by the processes described by Engs et al. in Patents Nos. 2,007,159 and 2,007,160; in addition, other types of catalytic processes are in successful operation. In these and similar operations some one or more of the enumerated olefins undergoes polymerization, and a product is obtained which consists wholly or in major part of acyclic mono-olefins, of boiling range determined by the particular character of the initial olefins, the identity of the catalyst and the conditions of catalysis, and the subsequent fractional separation steps that may be carried out.

The initial olefin-containing material introduced to such polymerizing systems may and often does contain material quantities of sulphur compounds as impurities, and if such sulphur-containing impurities are not rigorously and substantially completely removed prior to the catalysis, the polymer products contain sulphur compounds which are highly detrimental thereto for most purposes and which are by all ordinary processes difficult and costly to separate; such separation is nevertheless obligatory in the event that the polymers themselves are employed as aircraft fuels or in the event that hydrogenation is contemplated particularly with a hydrogenating catalyst that is not "sulphactive."

In the process of the present invention, the sulphur compounds in such liquid olefin polymers are catalytically decomposed in the vapor phase with the production of hydrogen sulphide, the hydrogen sulphide is removed and, at one stage in the system, a highly active catalyst is prepared for employment in the catalytic conversion operation.

Various catalytic processes and various specific catalysts are known for the vapor phase conversion of mercaptans and disulphides to hydrogen sulphide, when the same are accompanied by preponderant quantities of such hydrocarbons as compose natural petroleum distillates. When such processes and such catalysts are applied to the conversion of these sulphur compounds when accompanied by preponderant proportions of hydrocarbons which are wholly unsaturated in character, as are the olefin polymers (therefore differing very significantly from the petroleum distillates, which are composed in major part of paraffine and naphthene hydrocarbons, both saturated), however, the catalysts are poisoned or rendered of short life, or the process as a whole is rendered valueless, by virtue of the decomposition of the unsaturated hydrocarbons themselves.

It is accordingly an object of this invention to provide processes of removing sulphur from liquid acyclic olefin hydrocarbons of motor fuel and higher boiling range. It is a further object to decompose the sulphur compounds ordinarily existing in olefinic polymers, generally of mercaptan and/or disulphide type, to hydrogen sulphide. It is a still further object of the invention to provide suitable catalysts, methods of procedure and conditions of operation in which such sulphur-compound decomposition may be effected without substantial decomposition of the olefinic hydrocarbons which are preponderantly present, with high treating yields and long catalyst life. It is yet another object to provide a method of preparing a highly suitable catalyst for such said purposes, simultaneously with the sulphur-compound decomposition and removal.

In the process, the olefin polymers containing mercaptans or disulphides, or both, are led in vapor phase into and through a catalyst chamber packed with granular iron sulphide, nickel sulphide or cobalt sulphide, such catalyst chamber or body being maintained at a temperature within the range 675° to 800° F. and preferably within the range 700° to 750° F. Temperatures above 800° F. are distinctly undesirable in the operation, both to insure long catalyst life and by reason of the strong tendency of the polymers to decompose as temperature is increased, and the operation is carried out with best results at about 725° F., preferably under superatmospheric pressures of between 200 lbs. to 600 lbs. gauge pressure per square inch, as such superatmospheric pressure has been found conducive to best yields and highest effectiveness in mercaptan- and disulphide-decomposition. Pressures should under no circumstances be carried as high as 1,000 lbs. gauge, however, because of increased cyclization of the olefins and rapid deterioration of catalyst under such conditions.

Concurrently with the introduction of the olefin polymer vapors into and through the catalyst chamber, hydrogen or a gas yielding free hydrogen is likewise introduced, and such hydrogen introduction is essential in the practice of the process, both to assure long catalyst life and high efficiency of mercaptan- and disulphide-decomposition. The proportion of hydrogen introduced, with respect to the olefin polymer vapors fed, is so small as not to involve hydrogenation of any material quantities of the olefins themselves, and although the desirable proportions of hydrogen vary considerably with the amounts of sulphur compounds in the polymer stock and with the degree of decomposition desired to be effected, between 0.5 and 20 cu. ft. of hydrogen per gallon of liquid polymers charged has been found sufficient for optimum operation on stocks containing between 0.1% and 2.0% of sulphur present in mercaptan and/or disulphide form, such hydrogen as is chemically utilized in the passage through the chamber going substantially entirely to $H_2S$ production and substantially not at all to the hydrogenation of the unsaturated olefinic hydrocarbons. Thus the octane rating of the product, when the operation is carried out on polymer stocks of motor fuel boiling range, is substantially unchanged by passage through the system.

As catalysts, the sulphides of the metals of the iron group are alone suitable; iron sulphide is preferred by reason of its low cost and ease of preparation, although nickel and cobalt sulphides are effective in achieving the objects of the invention. As explained hereinbelow, iron (ferrous) sulphide may be formed in situ by the treatment of a porous iron oxide, such as iron rust or oxidized iron pyrites, with olefin polymer vapors containing sulphur compounds, in one stage of the operation in its complete aspect, and a ferrous sulphide so prepared has been found more active for the purposes of the invention than such iron sulphide as may ordinarily be purchased. The catalyst should be granular in form and of such grain size as not to impede free vapor flow; 30 to 60 mesh material is advantageous.

Upon passage through such a catalyst body under such conditions, mercaptans and/or disulphides are decomposed and $H_2S$ is formed. Upon emergence, the hydrocarbon vapors are condensed to liquid and fixed gases ($H_2S$ and excess hydrogen) are removed therefrom, preferably by rectification under suitable temperature and pressure conditions.

For the removal of such residual amounts of sulphur compounds as may not have been decomposed in the primary catalyst chamber, the rectified olefinic liquid may again be vaporized and the vapors passed through a second chamber filled with iron oxide in granular form, preferably a porous oxide such as iron rust or oxidized iron pyrites. In this chamber the temperature should be maintained within the same limits as those obtaining in the primary catalyst chamber, namely, between 675° and 800° F., preferably between 700° and 750° F., although the pressure may conveniently be lower by such a differential as will insure easy vapor passage through the entire system when the same is operated in a continuous unitary manner. Hydrogen or steam may be introduced to the iron oxide treating chamber in conjunction with the hydrocarbon vapors passing therethrough, to prolong the treating life of the oxide and to prevent poisoning of the iron sulphide which is formed as a result of the decomposition of the sulphur compounds and the concurrent formation of iron sulphide. In passing through such a chamber, residual quantities of sulphur compounds are decomposed and a highly effective iron sulphide catalyst is formed, for use in the primary iron sulphide catalytic operation. Subsequent to passage through this chamber, the olefin hydrocarbons are condensed and passed to storage.

In the drawing, the figure shows diagrammatically a complete system of flow and indicates the nature of apparatus suitable for the carrying out of the invention in its entirety. With reference to the drawing:

Three treating chambers, numbered 1, 2 and 3, are provided. Olefin polymer vapors and hydrogen enter treater 1 through line 4 controlled by valve 5, having passed through heat exchanger 27 and auxiliary heater 38; hydrogen introduction is controlled by metering valve 45 as shown, and the polymers are led from polymer storage under pressure imposed by the pump P as shown. The temperature of the vapors emerging from heater 38 is maintained at a point such that the effective catalyst body in the treater is within the range of optimum sulphur compound decomposition, as explained. Vapor outlet 6, for treater 1, is controlled by valves 7 and 8, such control serving the dual purpose of maintaining proper superatmospheric pressure and regulating rate of flow of vapors through the catalyst body.

Generally, treating chambers 1, 2 and 3 are insulated against heat losses and carry their granular treating agents on suitable supports such as screens; heating means in or around the chambers is usually unnecessary, since but slight superheating of the vapors in the heater 38 is required, due to the low heat requirements of the treating operations themselves, radiation losses alone requiring compensation.

During this stage of treatment, in treater 1, filled with ferrous, nickel or cobalt sulphide, the major proportion of the mercaptans and/or disulphides is decomposed and converted to hydrogen sulphide. The treated vapors leave treater 1 through outlet 6, valve 7, and pass through header 25 and heat exchanger 27 to condenser 28 and separator 29 where the olefin vapors are condensed and fixed gases such as hydrogen and hydrogen sulphide are removed in large part. These fixed gases may be treated for the recovery of hydrogen, which may be recirculated to the system inlet, as through metering valve 35.

From separator 29 the liquid olefins pass through line 30, heat exchanger 31 to stabilizer 32 where sufficient pressure is released to allow fractionation and the substantially complete removal of such hydrogen sulphide and other residual dissolved fixed gases as may still be present, in the manner shown.

The stabilized liquid olefins, in liquid phase, pass through line 33 and pump 34 to heater 35 where they are again vaporized, the pressure beyond pump 34 being somewhat less than that in treater 1 to afford such pressure differential as is required for suitable fractionation and removal of dissolved residual gases in stabilizer 32. From heater 35 the olefin vapors pass through auxiliary header 22, valve 20 and inlet 9 to treater 2.

In the initiation of operations, treater 2 is filled with iron oxide in granular form; temperature and pressure therein are maintained as explained above, and hydrogen or steam may be admitted if desired, for the reasons explained, through proper meter inlets (not shown). The residual sulphur compounds are removed in treater 2, the iron oxide is converted to iron sulphide, and the olefin vapors emerge through outlet 11, valve 13, header 26, heat exchanger 31 and condenser 36 to olefin storage.

In such removal of residual sulphur compounds in treater 2, vapors pass therethrough until the iron oxide therein is converted to iron sulphide as indicated by the mercaptan sulphur content in the product which emerges, and the iron sulphide thus formed serves as a highly effective catalyst in the primary catalytic stage of the operation, in a manner indicated briefly by the following alterations in flow: Olefin polymers and hydrogen at suitable temperature and pressure are charged through heat exchanger 27, heater 38, valve 10, inlet 9, treater 2, outlet 11, valve 12, header 25, heat exchanger 27, condenser 28, separator 29, line 30, heat exchanger 31, stabilizer 32, line 33, pump 34, heater 35, valve 21, inlet 14, treater 3 (filled with iron oxide and maintained at suitable temperature and pressure), outlet 16, valve 18, heat exchanger 31 and condenser 36 to storage. When flow is altered in this manner, treater 1 is not in operation and the iron sulphide therein may be revivified, converted to the oxide by burning, steaming or the like, or replaced by fresh porous iron oxide for use in the final treating stage of the operation. Thus when the oxide in treater 3 is exhausted and converted to sulphide, treater 1 is brought back into the system and the paths of flow are regulated as follows: Olefin vapors and hydrogen enter treater 3 through valve 15 and inlet 14 (treater 3 containing iron sulphide and maintained under proper pressure and temperature conditions), emerge through outlet 16, valve 17, line 25, heat exchanger 27, condenser 28, separator 29, line 30, heat exchanger 31, stabilizer 32, line 33, pump 34, heater 35, header 22, valve 19, treater 1 (containing fresh or regenerated iron oxide and at proper temperature and pressure), outlet 6, valve 8, header 26, heat exchanger 31 and condenser 36 to storage. During this latter system of flow the ferrous sulphide in treater 2 is revivified or replaced by iron oxide. Thus the periodic alterations in flow into and through treaters 1, 2 and 3 provide means of maintaining continuous operation and, at the same time, permit the preparation, use and revivification or renewal of the primary catalyst and treating agent.

It will be understood that the passage of olefin vapors through an iron sulphide catalyst chamber alone, for the decomposition of the major quantities of mercaptans and/or disulphides contained therein, may terminate the treating operation, in which event olefin vapor and hydrogen flow may be through either treater 1, treater 2 or treater 3 alone, by way of the appropriate valve (7, 12 or 17) to header 25, heat exchanger 27, condenser 28, separator 29 and line 39 to storage, with proper control of valves 40 and 41; or, with rectification, through line 30 to stabilizer 32, lines 33 and 42 to storage, with appropriate control of valves 40, 41, 43 and 44. Such operation, through a single catalyst chamber only, thus dispensing with a final iron oxide treatment, may be advantageous in the event that the olefin polymers are intended to be blended with large proportions of other hydrocarbon stocks, particularly in the event that such other hydrocarbon stocks are to be treated in ordinary liquid phase sweetening systems, as the added burden for sweetening polymers blended with such large proportions of other hydrocarbon stocks is negligible; such a final treatment with the oxide should not be dispensed with, however, in the event that the olefinic polymers are to be subsequently hydrogenated with a nickel or other hydrogenating catalyst not definitely "sulphactive."

In further exemplification of the character of the results which may be brought about by the practice of the process of the invention: A motor fuel type olefinic polymer fraction derived from a cracking still gaseous fraction whose monoolefinic content consisted of about 8% propylene, 42% iso-butene and 50% normal-butene and accompanied by major proportions of inert saturated paraffinic hydrocarbons, the polymerization effected with a liquid 100% $H_3PO_4$ film type catalyst at 250° F. and subsequently cut to a boiling range between about 100° and about 400° F., contained about 2.0% sulphur in mercaptan form. Such sulphur content is reduced from about 2.0% by weight to about 0.02% by weight upon passage of the polymers in vapor form through a single 30 to 60 mesh ferrous sulphide catalyst body maintained at about 725° F. and under about 400 lbs. per square inch gauge pressure, at a rate corresponding to about 5 volumes of liquid charge per bulk volume of catalyst per hour, accompanied by a hydrogen flow corresponding to about 10 cu. ft. (under standard conditions) per volume of liquid charge. When subsequent hydrogenation with the use of a nickel or other sulphur-sensitive catalyst is contemplated, passage of these once-treated polymers through the iron oxide chamber at a similar flow rate, at a similar temperature and at about 350 lbs. gauge pressure, causes essentially complete sulphur elimination (less than 0.002% by weight). The degree of unsaturation of the originally charged mono-olefinic polymers remains substantially unchanged, as the same may be measured directly by analytical methods or indirectly by octane rating tests.

The process is operable on olefin polymer stocks whose higher components may boil at temperatures up to 600° to 650° F. at atmospheric pressure.

As stated hereinabove, catalyst life is long and the decomposition of liquid olefins to gaseous products is negligible.

As likewise previously stated, the sulphides of iron, nickel and cobalt are alone active, in the presence of small amounts of hydrogen, to convert mercaptan sulphur to hydrogen sulphide. These sulphides are therefore regarded as falling within the broader scope of the invention and the term "metals of the iron group" has been used in the claims to designate those metals which fall in series 4, group VIII of the periodic system. In the claims, the terms "mercaptan sulphur" and "disulphide sulphur" are intended to designate combined sulphur present in organic compounds such as mercaptans and disulphides respectively, and are not intended to include free or uncombined sulphur.

In making the process and accomplishments of this invention known to those skilled in the art, the following significant facts should be mentioned: The mercaptans in ordinary cracked petroleum naphthas are largely of very low molecular weight and boil within the range 40° to 200° F., and the sweetening processes designed to sweeten or remove mercaptans and/or disulphides from such petroleum fractions have been constructed and operated under such conditions as will insure decomposition or removal of these low molecular weight, low boiling sulphur compounds. In contradistinction, the mercaptans contained in liquid olefinic polymer fractions such as those whose treatment is contemplated here are themselves the resultants of the "polymerizing" processes in which the polymers have been formed, and are of higher molecular weight, high stability and high boiling point: in polymer fractions of motor fuel boiling range, for example, the contained mercaptans boil within the range 200° to 400° F. Thus the problem of decomposing or removing the sulphur compounds contained in these polymer fractions is in no direct manner related to the removal or decomposition of petroleum naphtha type sulphur compounds.

It will be apparent to those skilled in the art that various modifications and alterations both of the apparatus and of the systems of flow hereinabove particularly described may be utilized in obtaining the benefits of the present invention. It will also be apparent that although specific operating data have been given and the process described in considerable detail, variations in the characteristics of particular olefin polymer types will enable or require obvious changes and modifications to be made. Accordingly, all such changes and modifications as come within the spirit and language of the appended claims are intended to be embraced within the scope of the present invention.

This application is a continuation of our copending application Serial No. 112,300, filed November 23, 1936, issued June 10, 1939, as Patent No. 2,143,078.

We claim:

1. A process of treating sulphur-containing hydrocarbons consisting in major part of liquid acylic mono-olefins which comprises passing said olefins in vapor phase and at a temperature of from approximately 675° F. to approximately 800° F. over a catalyst comprising a sulphide of a metal of the iron group, supplying hydrogen to said vapors and catalyst in a proportion sufficient to convert mercaptan- and disulphide-sulphur to hydrogen sulphide but insufficient to appreciably hydrogenate the said acyclic mono-olefins, removing hydrogen sulphide so formed, and passing the treated olefins at a temperature of from approximately 675° F. to approximately 800° F. over an oxide of a metal of the iron group, whereby the mercaptan-sulphur content of the olefins is further reduced by reaction with said oxide and the formation of a sulphide of said metal.

2. A process as in claim 1, in which said acyclic olefins are maintained at a pressure of from approximately 200 to 600 lbs. per square inch.

3. A process as in claim 1, in which the catalyst is an iron sulphide.

4. A process as in claim 1, in which the catalyst is a ferrous sulphide.

5. A process as in claim 1, in which the oxide is a porous iron oxide.

6. A process as in claim 1, in which the oxide is a porous iron oxide and which comprises the added steps of passing liquid acyclic mono-olefins in vapor phase and at a temperature of approximately 675° F. to approximately 800° F. over the sulphide formed from said oxide, and simultaneously supplying hydrogen to said vapors and sulphide in a proportion sufficient to convert mercaptan- and disulphide-sulphur to hydrogen sulphide but insufficient to appreciably hydrogenate the said acyclic mono-olefins.

7. A process of catalytically decomposing mercaptans with the production of hydrogen sulphide, which comprises passing hydrocarbons consisting in major part of liquid acyclic mono-olefins containing minor amounts of mercaptans in vapor phase over a sulphide of a metal of the iron group in the presence of between about 0.5 cu. ft. and about 20 cu. ft. of hydrogen per gallon of liquid mono-olefins, at a temperature between about 675° F. and about 800° F., whereby said mercaptans are catalytically converted to sulphur-free hydrocarbons and hydrogen sulphide without substantial hydrogenation of the said acyclic mono-olefinic hydrocarbons.

8. A process as in claim 7, in which the sulphide is a ferrous sulphide.

9. A process as in claim 7, in which the sulphide is a sulphide formed by the reaction of a porous oxide of the iron group with combined sulphur contained in acyclic olefin polymers which are normally liquid.

10. In a process of catalytically desulphurizing hydrocarbons consisting in major part of liquid acyclic olefin polymers with a sulphide of a metal of the iron group, the steps of forming a highly active desulphurization catalyst and simultaneously removing combined sulphur from normally liquid acyclic mono-olefins, which comprise treating a porous oxide of a metal of the iron group with the vapors of the said acyclic mono-olefins from said desulphurizing process containing combined sulphur capable of reacting with said oxide to form a sulphide of said metal, and maintaining the temperature of said vapors at from approximately 675° F. to approximately 800° F. during said treatment, thereby converting said oxide to an active sulphide catalyst for the catalytic desulphurization step.

11. A process as in claim 10, in which the said oxide is an iron oxide.

12. A process as in claim 10, in which the catalytic activity of the sulphide is enhanced by introducing hydrogen with the vapors of the acyclic mono-olefins, in amounts insufficient to appreciably hydrogenate the said acyclic mono-olefins, while contacting the metal oxide.

13. A process of treating hydrocarbons consisting in major part of normally liquid acyclic olefin polymers containing combined sulphur which comprises providing a plurality of treating chambers, at least one of which contains a catalyst comprising a sulphide of a metal of the iron group, and at least one of said chambers containing an oxide of a metal of the iron group, passing said olefin polymers in vapor phase over said sulphide catalyst, simultaneously supplying hydrogen to said vapors and catalyst in quantities sufficient to convert disulphides to mercaptans and a major portion of the mercaptan-sulphur to hydrogen sulphide, but insufficient to appreciably hydrogenate the said acyclic mono-olefins, maintaining the temperature of the gases in said sulphide catalyst chamber at a temperature between approximately 675° F. and approximately 800° F. to effect catalytic conversion of mercaptan-sulphur to hydrogen sulphide, removing the hydrogen sulphide so formed, passing said treated olefin polymers in vapor form through said oxide-containing chamber and over said metal oxide at a temperature of 675° to 800° F. to thereby remove residual mercaptan-sulphur, continuing said treatment until the oxide is converted to a sulphide and catalyzing conversion of mercaptan-sulphur to hydrogen sulphide with said last mentioned metal sulphide as formed in situ.

14. A continuous cyclic process for desulphurizing hydrocarbons consisting in major part of normally liquid acyclic mono-olefins which comprises providing a catalyst body composed of an iron sulphide and providing a reagent comprising an iron oxide, catalyzing conversion of mercaptan-sulphur to hydrogen sulphide with said catalyst body and treating the said acyclic mono-olefin vapors containing combined sulphur with said oxide whereby said catalyst becomes less active and said oxide is converted to a highly active catalytic sulphide, converting said first mentioned iron sulphide of reduced activity to a reagent oxide, catalyzing conversion of mercaptan-sulphur to hydrogen sulphide with said sulphide formed in situ from said first mentioned oxide, and utilizing said oxidized iron sulphide to remove residual mercaptan-sulphur in olefin polymer vapors from a catalytic iron sulphide treatment.

15. A process of catalytically converting mercaptans to hydrogen sulphide and hydrocarbons which comprises passing vapors containing a mercaptan, together with a small amount of hydrogen over an iron sulphide formed by the reaction of iron rust with organic sulphur compounds contained in materials comprised substantially wholly of normally liquid acyclic olefin polymers, said catalysts and vapors being at a temperature of from approximately 675° F. to approximately 800° F., and said small amount of hydrogen being at least 0.5 cu. ft. but less than about 10 cu. ft. per gallon of liquid polymers and insufficient to cause material hydrogenation of said hydrocarbons.

16. A process of catalytically converting mercaptans to hydrogen sulphide and hydrocarbons which comprises passing vapors containing a mercaptan, together with a small amount of hydrogen over an iron sulphide formed by the reaction of oxidized iron pyrites with organic sulphur compounds contained in materials comprised substantially wholly of normally liquid acyclic olefin polymers, said catalysts and vapors being at a temperature of from approximately 675° F. to approximately 800° F., and said small amount of hydrogen being at least 0.5 cu. ft. but less than about 10 cu. ft. per gallon of liquid polymers and insufficient to cause material hydrogenation of said hydrocarbons.

ARTHUR L. LYMAN.
ROBERT C. MITHOFF.
HOWARD B. NICHOLS.